United States Patent
Ingemi (12)

(10) Patent No.: US 9,601,944 B2
(45) Date of Patent: Mar. 21, 2017

(54) POWER SUPPLY CONTROL

(75) Inventor: Michael J. Ingemi, Norwood, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 343 days.

(21) Appl. No.: 14/389,891

(22) PCT Filed: Apr. 2, 2012

(86) PCT No.: PCT/US2012/031848
§ 371 (c)(1),
(2), (4) Date: Oct. 1, 2014

(87) PCT Pub. No.: WO2013/151528
PCT Pub. Date: Oct. 10, 2013

(65) Prior Publication Data
US 2015/0076905 A1    Mar. 19, 2015

(51) Int. Cl.
*H02J 3/00* (2006.01)
*H02J 3/14* (2006.01)
(Continued)

(52) U.S. Cl.
CPC .............. *H02J 9/00* (2013.01); *H02J 9/062* (2013.01); *H02M 1/088* (2013.01);
(Continued)

(58) Field of Classification Search
CPC ......... H02J 9/00; H02J 9/062; H02M 3/33576
(Continued)

(56) References Cited

U.S. PATENT DOCUMENTS

| 5,424,936 A | 6/1995 | Reddy |
| 2002/0057062 A1 | 5/2002 | Kisaichi et al. |

(Continued)

FOREIGN PATENT DOCUMENTS

| CN | 1482726 | 3/2004 |
| CN | 101860055 | 10/2010 |
| GB | 2335550 A | 9/1999 |

OTHER PUBLICATIONS

Extended European Search Report from corresponding European Application No. 12873602.2 dated Oct. 27, 2015.
(Continued)

*Primary Examiner* — Carlos Amaya
(74) *Attorney, Agent, or Firm* — Lando & Anastasi, LLP

(57) ABSTRACT

According to a first aspect, an uninterruptable power supply is provided. In one example, the uninterruptable power supply comprises a controller configured to provide a first current reference signal, the first current reference signal having a periodic waveform including a first half period and a second half period, each half period having a period end, the waveform comprising a substantially rectified sine wave modified such that a value of the rectified sine wave is equal to zero for a predetermined period of time prior to the period end of the second half period, a positive current loop control circuit configured to receive the first current reference signal and provide an output signal to the positive boost circuit, and a negative current loop control circuit configured to provide an output signal to a negative boost circuit.

20 Claims, 6 Drawing Sheets

(51) Int. Cl.
*H02J 9/00* (2006.01)
*H02J 9/06* (2006.01)
*H02M 1/088* (2006.01)
*H02M 1/42* (2007.01)
*H02M 3/335* (2006.01)

(52) U.S. Cl.
CPC ..... *H02M 1/4208* (2013.01); *H02M 3/33576* (2013.01); *Y10T 307/406* (2015.04)

(58) Field of Classification Search
USPC .......................................................... 307/31
See application file for complete search history.

(56) References Cited

U.S. PATENT DOCUMENTS

| 2003/0220026 | A1 | 11/2003 | Oki et al. |
| 2004/0041548 | A1 | 3/2004 | Perry |
| 2006/0238941 | A1* | 10/2006 | Ingemi ................... H02J 9/062 361/92 |
| 2009/0160259 | A1 | 6/2009 | Naiknaware et al. |
| 2010/0315849 | A1 | 12/2010 | Ingemi et al. |

OTHER PUBLICATIONS

Notification of Transmittal of the International Search Report and the Written Opinion of the International Searching Authority from corresponding PCT/US2012/031848 dated Jul. 20, 2012.

\* cited by examiner

POWER SUPPLY CONTROL

This application is a U.S. National Stage Application and claims priority under 35 U.S.C. §371 of International Application No. PCT/US2012/031848, filed Apr. 2, 2012, which is hereby incorporated herein by reference in its entirety.

BACKGROUND

Field of the Invention

At least one embodiment in accordance with the present invention relates generally to control of an uninterruptable power supply input circuit.

Discussion of Related Art

Power converters may be employed to convert a multi-phase AC input to a DC output. The DC output is often supplied to a DC bus or link. For example, an uninterruptible power supply ("UPS") may include a power converter and may further include an inverter, which converts the DC power supplied by the DC bus to an AC signal at an output of the UPS. The DC bus may connect the output of the power converter to an input of the inverter. The UPS may also include a backup source of DC power (e.g., a battery power source, a DC generator, etc.). The output of the UPS can be connected to an electrical load to increase the reliability of the power supplied to the load.

Various types of UPS systems may employ power converters. For example, power converters may be employed in an on-line UPS that can supply power derived from a primary source of power and/or a backup source of power without interruption provided either the primary power source or the secondary power source is available. Power converters may also be employed in an off-line UPS system that includes a transfer switch that switches power if primary power is lost unexpectedly and there is an interruption in power supplied to the electrical load.

The average power obtained from an AC line supply through the UPS described above is typically less than the product of the RMS (root mean square) voltage and the RMS current. The ratio of the average power to the product of the RMS voltage and the RMS current is known as the power factor. Power Factor Correction (PFC) is used to improve an input power factor and comply with various utility standards. Some utilities add additional charges or penalize customers having equipment that does not include PFC. PFC schemes control the input current drawn by a UPS to follow the input voltage in both shape and time.

SUMMARY

According to a first aspect, an uninterruptable power supply is provided. The uninterruptable power supply comprises an input to receive an input AC voltage, an input circuit coupled to the input and including a positive boost circuit and a negative boost circuit, and configured to provide a positive DC voltage at a first output and a negative DC voltage at a second output, a controller coupled to the input circuit and configured to provide a first current reference signal, the first current reference signal having a periodic waveform including a first half period and a second half period, each half period having a period end, the waveform comprising a substantially rectified sine wave modified such that a value of the rectified sine wave is equal to zero for a predetermined period of time prior to the period end of the second half period, a positive current loop control circuit coupled to the controller and to the positive boost circuit and configured to receive the first current reference signal and provide an output signal to the positive boost circuit, and a negative current loop control circuit coupled to the controller and to the negative boost circuit and configured to provide an output signal to the negative boost circuit.

In the uninterruptable power supply, the controller may be further configured to provide a second current reference signal to the negative current control circuit, the second current reference signal having a periodic waveform having a first half period and a second half period, each half period having a period end, the waveform comprising a substantially inverted rectified sine wave modified such that a value of the inverted rectified sine wave is equal to zero for a predetermined period of time prior to the period end of the first half period. In one example, each of the positive current loop control circuit and the negative current loop control circuit may comprise a clamp circuit each coupled to the current error amplifier.

In some examples, the predetermine period of time is approximately 0.8 milliseconds. The positive boost circuit may include a first inductor and the negative boost circuit includes a second inductor and wherein the controller is configured to detect an inductor current from at least one of the first inductor and the second inductor and provide an inductor current value to at least one of the positive current loop control circuit and the negative current loop control circuit. The negative current loop control circuit may include a current error amplifier configured to receive the second current reference signal and the inductor current from the second inductor and configured to generate a current error value.

In one example, the positive current loop control circuit includes a current error amplifier configured to receive the first current reference signal and the inductor current from the first inductor and configured to generate a current error value. In addition, the positive boost circuit may include a first transistor, and the positive current loop control circuit includes a comparator configured to receive the current error value from the current error amplifier and wherein the first transistor is configured to switch to an on state based on an output of the comparator.

The negative current loop control circuit may include a current error amplifier configured to receive the second current reference signal and the inductor current from the second inductor and configured to generate a current error value. The negative boost circuit may include a second transistor, and the negative current loop control circuit includes a comparator configured to receive the current error value from the current error amplifier and wherein the second transistor is configured to switch to an on state based on an output of the comparator.

Another aspect of the invention is directed to a method of operating an uninterruptable power supply including an input circuit including a positive boost circuit and a negative boost circuit. The method comprises receiving an input AC voltage at an input of the input circuit, generating a first current reference signal, the first current reference signal having a periodic waveform including a first half period and second half period, each half period having a period end, the waveform comprising a substantially rectified sine wave modified such that a value of the rectified sine wave is equal to zero for a predetermined period of time prior to the period end of the second half period, producing, by a positive current loop control circuit, a first output signal based in part on the first current reference signal and providing the first output signal to the positive boost circuit, producing, a second output signal, by a negative current loop control circuit, and providing the second output signal to the negative boost circuit, and generating a positive DC voltage at a first output of the positive boost circuit and a negative DC voltage at a second output of the negative boost circuit.

The method may further include generating a second current reference signal having a periodic waveform a first half period and a second half period, each half period, each half period having a period end, the waveform comprising a substantially inverted rectified sine wave modified such that a value of the inverted rectified sine wave is equal to zero for a predetermined period of time prior to the period end of the first half period and producing, by the negative current loop control circuit, the second output signal based in part on the second current reference signal. In the method, the predetermined period of time may be approximately 0.8 milliseconds.

In the method, the positive boost circuit may include a first inductor and the negative boost circuit including a second inductor. The method may further comprise detecting an inductor current from at least one of the first inductor and the second inductor, and providing an inductor current value to at least one of the positive current loop control circuit and the negative current loop control circuit. The method may further comprise generating a current error value based on at least one of the first current reference signal and the second current reference signal and the inductor current value, by at least one of a first current amplifier included in the positive current loop and a second current amplifier included in the negative current loop.

In addition, the method may further comprise discharging a minority charge of the first current error amplifier and the second current error amplifier prior to the period end of the second half period associated with the periodic waveform of the first current reference signal and prior to the period end of the first half period of the periodic waveform of the second current reference signal.

The method may also comprise generating a pulse width modulation control waveform based in part on the current error value, the pulse width modulation control waveform having a switching frequency. The predetermined period of time prior to the period end may be approximately a sixth of the switching frequency.

Another aspect is directed to an uninterruptable power supply. The uninterruptable power supply comprising an input to receive an input AC voltage, an input circuit coupled to the input and including a positive boost circuit and a negative boost circuit, and configured to provide a positive DC voltage at a first output and a negative DC voltage at a second output, a controller coupled to the input circuit and configured to provide a first current reference signal, the first current reference signal having a periodic waveform including a first half period and a second half period, each half period having a period end, a positive current loop control circuit coupled to the controller and to the positive boost circuit having a first current error amplifier and configured to provide an output signal to the positive boost circuit, a means for discharging an excess charge associated with the first current error amplifier to allow the first current error amplifier to come out of saturation prior to the period end of the second half period associated with the periodic waveform of the first current reference signal, and a negative current loop control circuit having a second current error amplifier coupled to the controller and to the negative boost circuit and configured to provide an output signal to the negative boost circuit.

In the uninterruptable power supply, the controller may be configured to provide a second current reference signal, the second current reference signal having a periodic waveform including a first half period and a second half period, each half period having a period end, and further comprising means for discharging an excess charge the second current error amplifier to allow the second current error amplifier to come out of saturation prior to the period end of the first half period associated with the periodic waveform of the second current reference signal.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
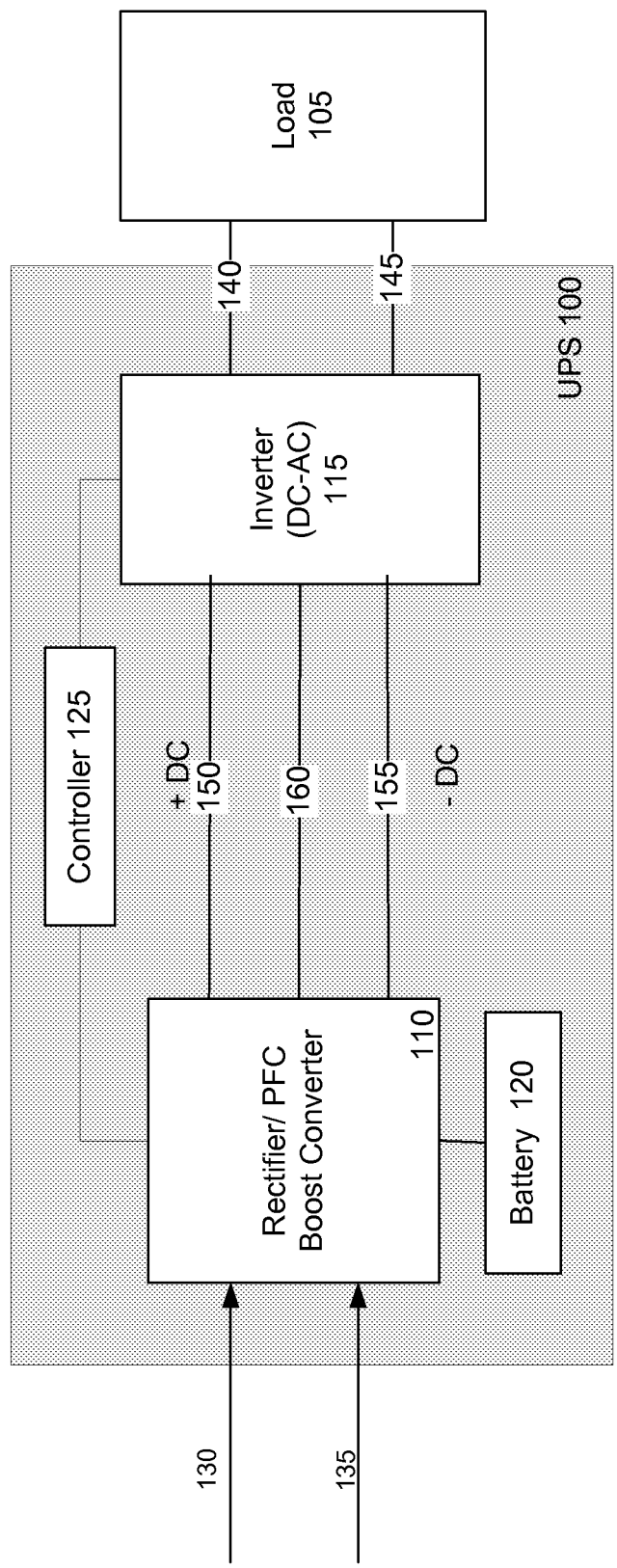
FIG. 1 is a functional block diagram depicting an uninterruptable power supply in accordance with an embodiment of the invention.

Various aspects and embodiments disclosed herein are directed to controlling power factor correction, total harmonic distortion of systems, uninterruptable power supplies, and to methods of distributing power to a load. As discussed further below, for example, a UPS system in accordance with one embodiment may include a positive and a negative boost converter circuit. The positive boost circuit is active) during the positive portion of the input voltage waveform and the negative boost circuit is active during the negative portion of the input voltage waveform. Each boost converter circuit is controlled using a current reference waveform and sensed inductor current. The current waveform operates in conjunction with a respective current loop control circuit for the negative and positive boost circuits. In one embodiment, to reduce total harmonic distortion, the current waveform is modified from that typically used during the inactive state of each boost converter to cause a current amplifier, included in each current control loop, to come out of saturation and into its active region prior to activating the positive and the negative boost circuits, respectively.

The aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

FIG. 1 is a functional block diagram of an uninterruptable power supply (UPS) 100 in accordance with an embodiment. The UPS 100 provides power to at least one load 105 and includes at least one input circuit 110, such as a rectifier, (e.g., a buck-boost converter circuit, which may also be referred to as a positive boost converter and a negative boost converter, or universally as a boost converter circuit or simply boost converter,) at least one inverter 115, at least one battery 120, and at least one controller 125. The UPS 100 also includes AC input lines 130 and 135 that couple respectively to line and neutral of an input AC power source. The UPS 100 also includes outputs 140 and 145 to provide an output line and neutral to load 105.

In line mode of the UPS 100 operation, in one embodiment under the control of controller 125, input circuit 110 receives input AC voltage from inputs 130 and 135 and provides positive and negative output DC voltages at output lines 150 and 155 with respect to common line 160. In a battery mode of operation of the UPS 100, for example upon loss of input AC power, the input circuit 110 may generate DC voltages from battery 120. In this example, the common line 160 is coupled to the input neutral line 135 and the output neutral line 145 to provide a continuous neutral through UPS 100. The inverter 115 receives DC voltages from the input circuit 110 and provides output AC voltage at lines 140 and 145.

Figure 2:
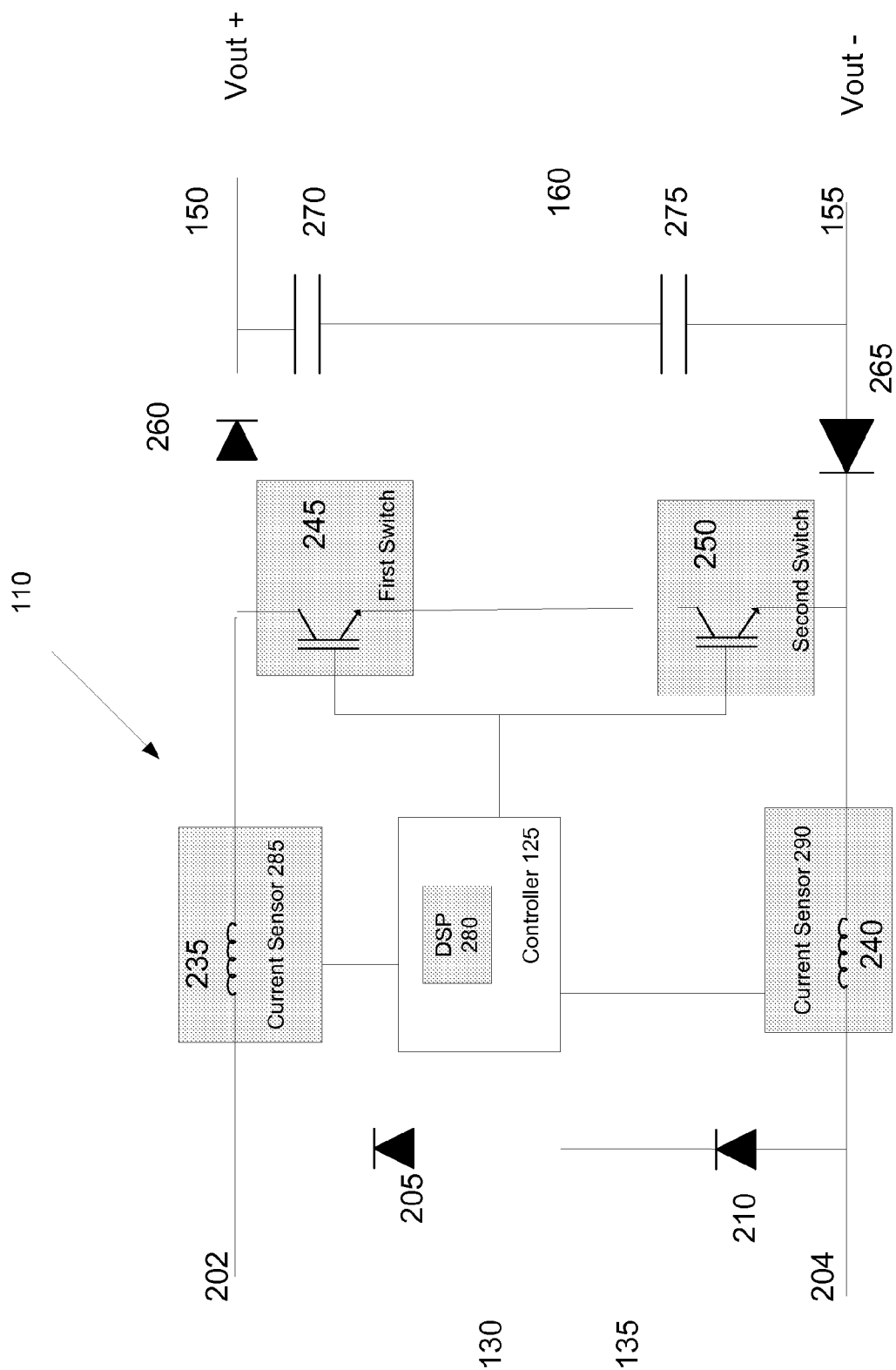
FIG. 2 is a schematic diagram depicting an input circuit in accordance with an embodiment of the invention.

FIG. 2 is a schematic diagram depicting the input circuit 110 in accordance with an embodiment of the invention. As illustrated in FIG. 2, the input circuit 110 is a two phase input circuit. However, it is appreciated that the input circuit, may be a three phase input circuit that includes voltage input lines Phase A, Phase B, and Phase C. The three phase input circuit may include additional components such as additional inductors, diodes and switches.

As shown in FIG. 2, the input circuit 110 includes input diodes 205 and 210, inductors 235 and 240, a first switch 245 and a second switch 250, output diodes 260 and 265, and output capacitors 270 and 275. The rectified input lines 202 and 204 are coupled with inductors 235 and 240, such that positive and negative rectified voltages are respectively provided to inductors 235 and 240. In one embodiment, inductor 235 operates in conjunction with first switch 245 and the output diode 260 as a positive boost converter under control of the controller 125, using pulse width modulation to provide a positive DC voltage across output capacitor 270. In this example, the first switch 245 operates as a positive boost transistor. Analogously, inductor 240 operates in conjunction with the second switch 250 and the output diode 265 as a negative boost converter under control of the controller 125, using pulse width modulation to provide a negative DC voltage across output capacitor 275. In this example, the second switch 250 operates as a negative boost transistor.

In one embodiment, the input circuit 110 may also include an additional transistor (not shown) that forms part of a buck-boost converter in a battery mode of operation to generate the DC voltages. The positive boost circuit that includes the inductor 235, the first switch 245, and the output diode 260 also generates the positive DC voltage across the output capacitor 270 in battery mode of operation. In one embodiment, to generate negative voltage across the output capacitor 275 in battery mode of operation, switches 245 and 250 operate as a buck-boost circuit with switch 250 being cycled on and off. In various embodiments, the configuration of the input circuit 110 differs from the embodiment of FIG. 2. For example, in some embodiments, such as for an input DC voltage, input diodes 205 and 210 need not be used.

In some embodiments, and as described below, a controller such as the controller 125 controls the operation of the input circuit 110 to provide power factor correction (PFC) at the input of the UPS 100 so that the UPS 100 input current and input voltage are substantially in phase. The controller 125 may also control the mode of operation of the input circuit 110, to control the operating frequency of the input circuit 110. In at least one embodiment, the controller provides control signals to switches 245 and 250 to control the input current using pulse width modulation.

In one example, the controller 125 may include at least one processor or other logic device. In some embodiments, the controller 125 includes a digital signal processor (DSP) 280. The controller 125 may also include at least one field programmable gate array (FPGA) and an application specific integrated circuit (ASIC), or other hardware, software, firmware, or combinations thereof. In various embodiments, one or more controllers may be part of the UPS 100, or external to but operatively coupled with the UPS 100.

In one embodiment, the controller 125 includes at least one control signal generator. The control signal generator may be part of the controller 125 or a separate device that outputs a control signal responsive, at least in part, to instructions from the controller 125. In one embodiment, the control signal generator includes at least one DSP and an FPGA. The control signal generator may generate, form, or otherwise output a control signal such as a pulse width modulation (PWM) control signal. In one embodiment, a control signal generator, for example in combination with controller 125, can adjust the duty cycle of a PWM control signal applied to switches 245 and 250.

As illustrated in FIG. 2, current sensors 285 and 290 may sample or otherwise determine inductor current at inductors 235 and 240. In one embodiment, inductor current values identified by the current sensors 285 and 290 are provided to the controller 125. The inductor current values identified by the current sensors 285 and 290 can also be provided to the current error amplifier, described further below. Based at least in part on one or more sensed inductor current values, the controller 125 can control the switches 245 and 250.

With respect to FIGS. 1, and 2, the DSP 280 can control the input circuit 110 to provide PFC using analog and digital circuitry, included in the DSP 280. In some embodiments, this PFC control scheme employs the DSP 280 to produce a reference signal to control both the voltage loop and analog circuitry for the current loop for both the positive and the negative boost converter side. For example, an analog portion of the controller 125 may detect a zero current state associated with at least one inductor. In one embodiment, this indicates that a new switching cycle may begin, and the controller 125 may proceed to send a signal to turn ON a switch, (e.g., the first switch 245 or the second switch 250) for an amount of time ($T_{ON}$), which may be determined by the output of a difference equation. In one embodiment, the controller 125 also includes an enablement signal that, for example, must be in a particular state (e.g., a logic one, or high state) to enable the controller 125 to operate the switches.

To control the voltage loop, the DSP 280 may use a voltage difference equation to generate a voltage error value. Continuing with this embodiment, the voltage error values can be provided to the controller 125. In one embodiment, the controller 125 processes the voltage error value in the difference equation and the output of this computation includes a pulse width modulation control signal modulated to provide power factor correction of the input circuit 110.

In one embodiment, the controller 125 adjusts at least one duty cycle of the pulse width modulation control signal to independently provide PFC to both the positive and negative converter circuits of the input circuit 110 and regulate output voltage at capacitors 270 and 275. For example, the controller 125 can adjust a first pulse width modulation signal duty signal to provide PFC to the positive converter of the input circuit 110, and can independently adjust a second pulse width modulation signal duty cycle to provide PFC correction to the negative converter of the input circuit 110. In one embodiment, the UPS 100 controlled in accordance with embodiments of the present invention exhibits low total harmonic distortion (THD).

Figure 3:
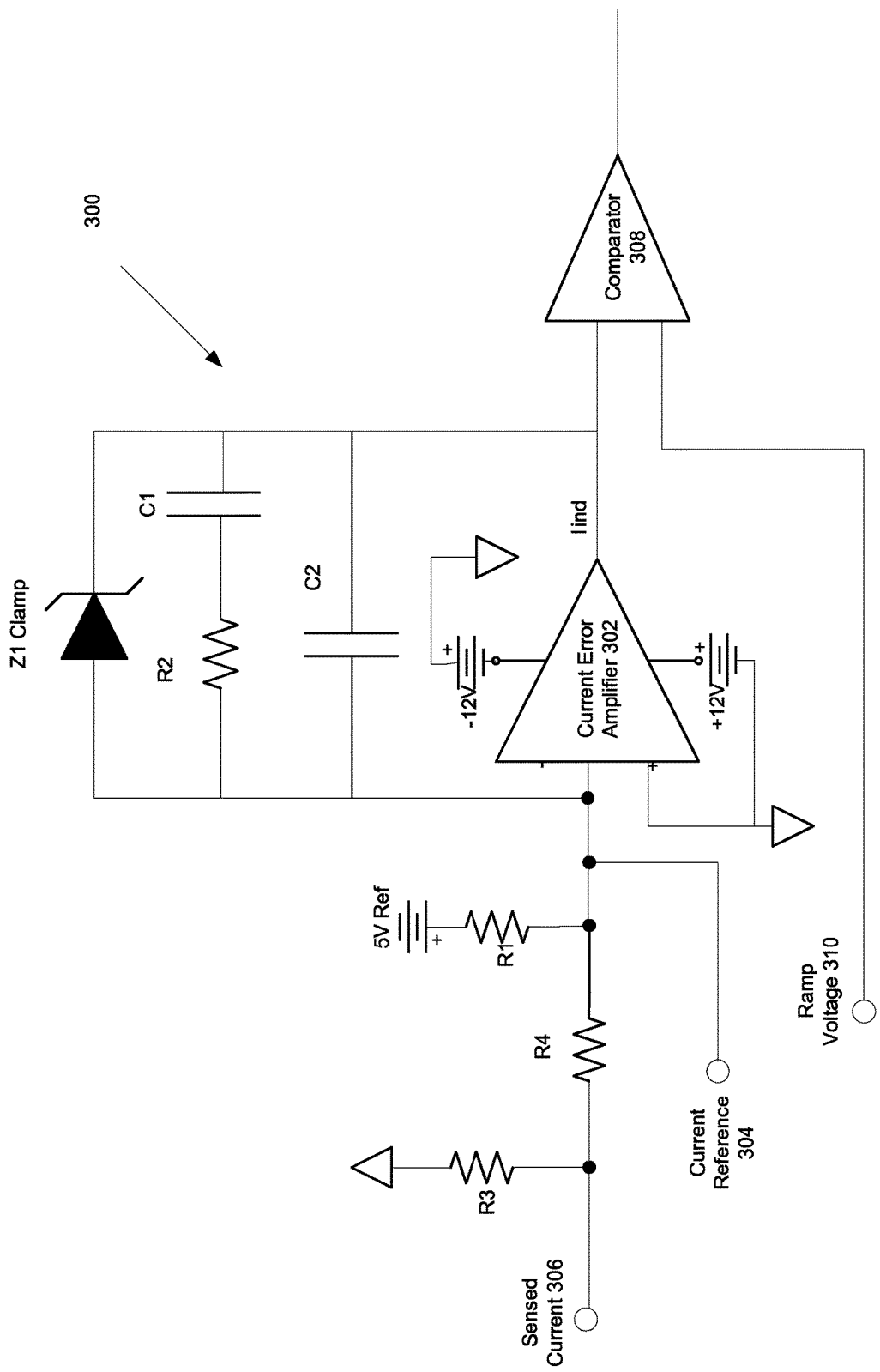
FIG. 3 is a schematic diagram depicting a current loop circuit in accordance with an embodiment of the invention.

FIG. 3 is a schematic diagram depicting a typical analog circuit 300 used as a positive current loop control circuit for the positive boost circuit. A similar negative current loop control circuit having the same configuration as the positive current loop control circuit is implemented for the negative boost circuit which includes a second current error amplifier. The analog circuit 300 includes a current error amplifier 302, an input 304 to receive a current reference signal from the DSP 280, an input 306 to receive a sensed current signal from current sensor 285 or current sensor 290, resistors R1, R2, R3 and R4, capacitors C1 and C2, a Zener diode Z1, a comparator 308 and an input 310 to receive a ramp voltage.

The inductor current signal and the current reference signal from the DSP are input to current error amplifier 302. The current reference signal from the DSP 280 may be filtered by a filter circuit and buffered by an additional amplifier (not shown) and input to the current error amplifier 304. The second input to the current error amplifier is sensed current detected from inductor 235 by current sensors 285 of the positive boost converter. The current sensor 285 may produce an inductor current signal of positive polarity.

The current reference signal 304 and the sensed inductor current signal 306 are summed at the input to the current error amplifier 302. R1 provides biasing current for the no load condition. Components R2, C1 and C2 provide tailoring of the current error amplifier's gain over frequency. Zener diode Z1 provides a clamp for the positive saturation voltages of current error amplifier 302. Comparator 308 compares the amplified current error signal to ramp voltage signal at input 310. The ramp voltage may have a frequency of 40 kHz. If the ramp voltage is below the output of current error amplifier 302 the output of comparator 308 is high. Once the ramp voltage exceeds the amplified error signal, the output from the comparator 308 goes low, thus generating the pulse width control signal for the switch 245.

Similarly, for the negative boost converter side, the current reference signal input to the second current error amplifier may be a filtered rectified signal received from the DSP 280. The current detected from the inductor 240 by the current sensor 290 of the negative boost converter is also input to the second current error amplifier and the two inputs are summed at the input to the second current error amplifier. Similarly, compensation components R2, C1, C2 and Zener diode Z1 provide a clamp circuit for the negative saturation voltages of the second current amplifier.

Figure 4A:
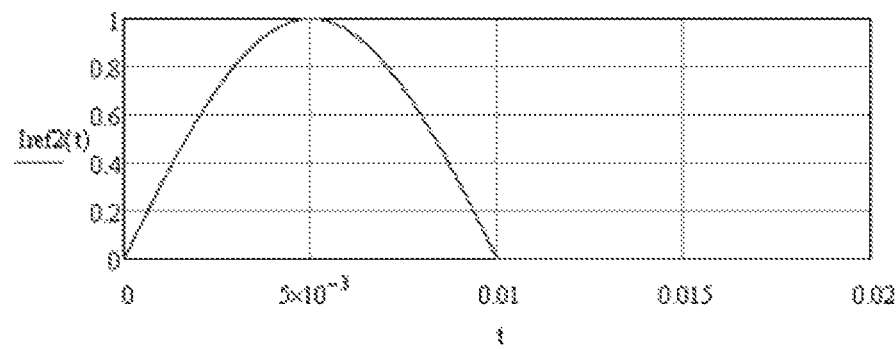
FIG. 4A is a graph depicting a positive current reference waveform in accordance with an embodiment of the invention.
Figure 4B:
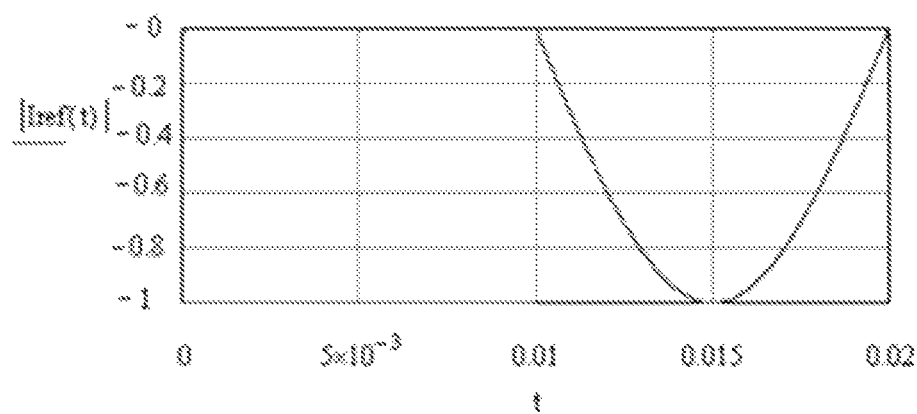
FIG. 4B is a graph depicting a negative current reference waveform in accordance with an embodiment of the invention.

In a typical UPS, for both the positive and negative boost converters, the current reference waveform has a positive or active side and a negative or inactive side. FIG. 4A shows one example of a current reference waveform used in the positive current loop circuit in a typical UPS. As shown in FIG. 4A the waveform sets the positive current reference to zero during the negative half (or the inactive side) of the input voltage waveform. Similarly, as shown in FIG. 4B, the negative current reference is set to zero in the positive half (or the inactive side) of the input voltage waveform.

Figure 4C:
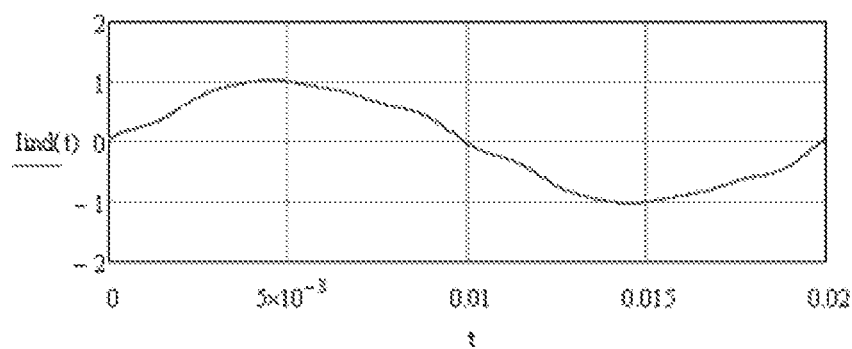
FIG. 4C is a graph depicting a resultant current waveform in accordance with an embodiment of the invention.

In the typical UPS, the current error amplifier of the inactive side may be saturated either positive or negatively depending on the nature of the current reference signal. As the current reference signal transitions from the inactive side to the active side, the current error amplifier transitions from a saturated region to an active region. The transition of the current error amplifier from the saturated state to the active region does not occur instantaneously. Instead, the current error amplifier stores an excess minority charge in the base of the current error amplifier. The time it takes for the current error amplifier to remove the excess change stored in the base results in a delay. As shown in FIG. 4C, the discharge time or the delay time can result in an asymmetrical current waveform output with corresponding large 3rd, 5th, 7th and 9th harmonic terms. The large harmonic terms can increase the line current Total Harmonic Distortion (THD).

Figure 5A:
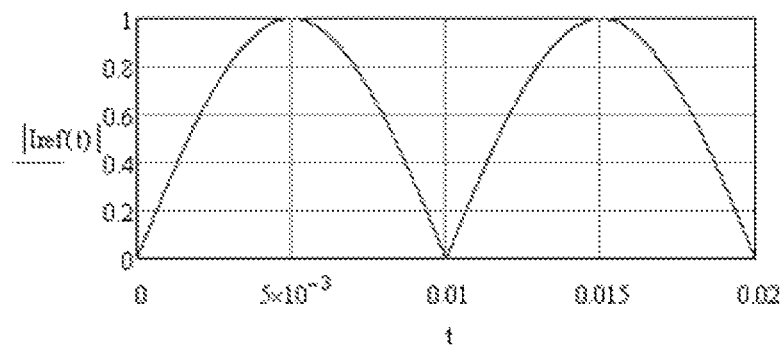
FIG. 5A is a graph depicting a positive current reference waveform in accordance with an embodiment of the invention.
Figure 5B:
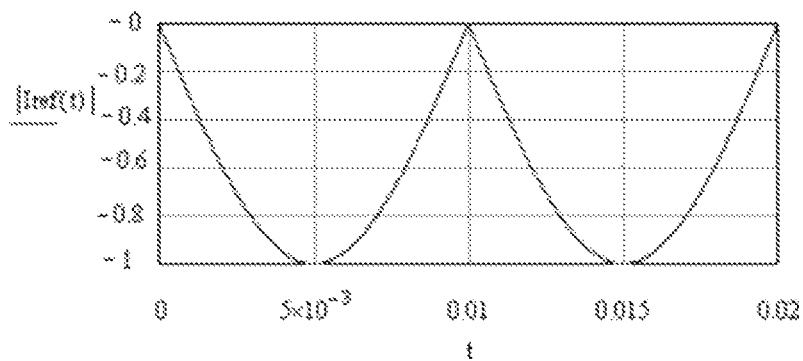
FIG. 5B is a graph depicting a negative current reference waveform in accordance with an embodiment of the invention.
Figure 5C:
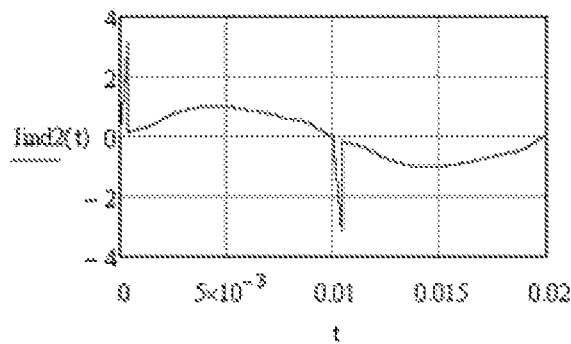
FIG. 5C is a graph depicting a resultant current waveform in accordance with an embodiment of the invention.

FIG. 5A shows another example of a current reference waveform used in the positive current loop circuit in a typical UPS. As shown in FIG. 5A, the waveform sets the positive current reference equally for both the positive and the negative half of the input voltage waveform. Similarly, as shown in FIG. 5B, the negative current reference is set equally for both the positive and the negative half of the input voltage waveform. The use of the waveform of FIGS. 5A and 5B may result in a delay before the inductor current is controlled at the start of the next cycle due to a discharge time associated with the current error amplifier. As shown in FIG. 5C, the delay can introduce a large spike in the output current waveform. The spike can result in an asymmetrical current waveform with corresponding harmonic terms.

According to various embodiments, to provide a symmetrical output current waveform without corresponding harmonic terms and to insure stable operation of both the positive and the negative current loops, the current reference waveform is modified from the waveform shown in FIGS. 5A and 5B. The current reference waveform is modified to a substantially rectified waveform equal to zero for a predetermined period of time prior to a period end of the waveform. In examples described herein, the modified current reference waveform is reduced to zero before approximately a sixth of the switching frequency of the PWM signal. In addition, the designed gain of the current error amplifier at the switching frequency of the PWM signal needs to be low enough to assure that the slope of the rising current in one of the inductors is less than the slope of the ramp voltage provided by the ramp generator. Finally, the current loop provides adequate noise margin to limit the switching noise of the PFC.

The current reference waveform, in one example, produced for the positive current loop control circuit is modified so that as the second half cycle is about to start, the current reference waveform is equal to zero for a predetermined period of time prior to the period end of the second half cycle. Analogously, the current reference waveform produced for the negative current loop control circuit is equal to zero for a predetermined period of time prior to the period end of the waveform prior to the start of the first half cycle. The modified current reference waveform provides for the current error amplifier included in both the positive and the negative boost converter side with enough time to discharge the stored excess minority charge and to come out of saturation into the active region. Because the current reference signal is a periodic waveform, the predetermined time period may be measured in milliseconds or in degrees of an angle. In one example, the predetermined time period prior to the period end of the waveform is approximately 0.8 to 1 milliseconds or approximately 9 to 18 degrees before the zero crossing.

Referring again to FIG. 3, according to various embodiments, the time needed to bring the error amplifier from saturation and into an optimal operating range (active region) is determined in part by the values associated with the clamp circuit, which includes the Zener diode Z1, compensation components including the resistor R2 and capacitors C1 and C2, and the bias resistor R1. The optimal operating range is further determined by the value of the ramp voltage produced by the ramp generator that yields a duty cycle of 90%.

Accordingly, the current reference waveform is modified based on the values of the clamp circuit and the compensation components. According to one example, Zener diode Z1 may be 6.8 volts and capacitors C1 and C2 both add to the output to input capacitance, which may total 5.7 nanofarads. In at least one example, the biasing resistor R1 is approximately 220 kilohms. As the result, the bias current is approximately 22 microamps and the discharge time to bring the output of the current error amplifier to 3.6 volts is approximately 0.830 milliseconds. According to one example, the current reference waveform is equal to zero approximately 14.9 degrees prior to the period end. In other examples, a 10 degree angle prior to the period end is sufficient. The voltage, current, capacitance, and resistance values used herein are for the purpose of example only and other values can be used.

According to at least one example, the predetermined time period (or the angle) may need to be larger depending on the current sensor used. For example, if one of the current sensors 285 and 290 has an offset current, that current may detract from the bias current. In one example, the current sensor may have a bias current of 300 micro amps through the resistor R3 (approximately 66.5 ohms). This produces a negative bias current through the resistor R4 (approximately 5.6 kilohms). This negative bias current is 3.56 micro amps and is subtracted from the bias current of 22 microamps. The net discharging current is then 18.4 micro amps, which increases the discharge time to approximately 0.992 milliseconds. In this example, the current reference waveform is reduced to zero approximately 18 degrees prior to the period end. The calculations in these examples are based on 50 Hz operation. In other examples, the analog circuit operates at 60 Hz operation which may result in other angles calculated. The input bias current of the current error amplifier 302 is approximately 200 picoamps and may be ignored.

Figure 6A:
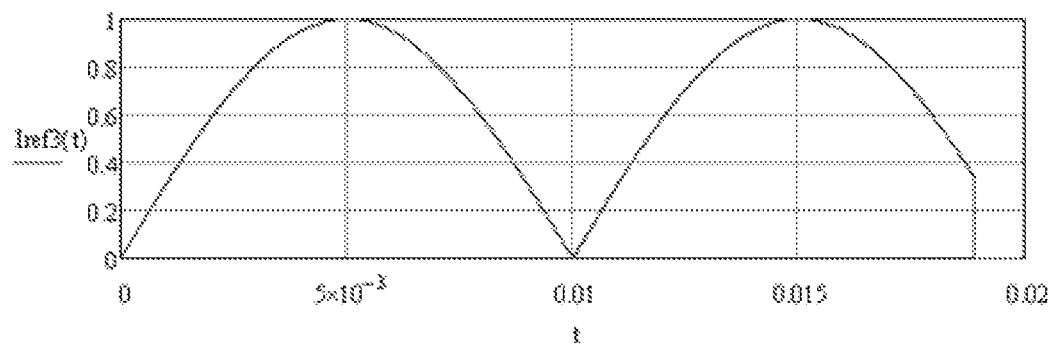
FIG. 6A is a graph depicting a modified positive current reference waveform in accordance with an embodiment of the invention.
Figure 6B:
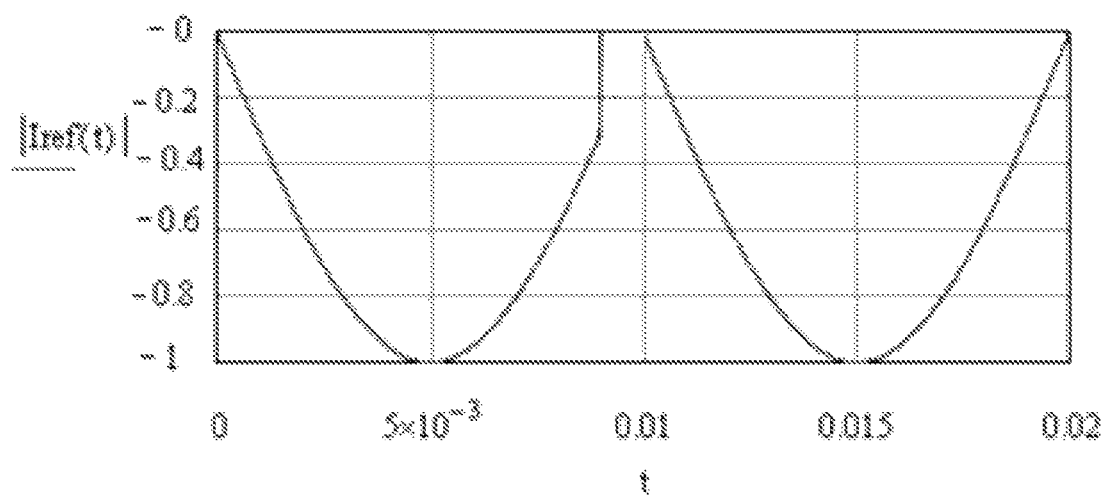
FIG. 6B is a graph depicting a modified negative current reference waveform in accordance with an embodiment of the invention.
Figure 6C:
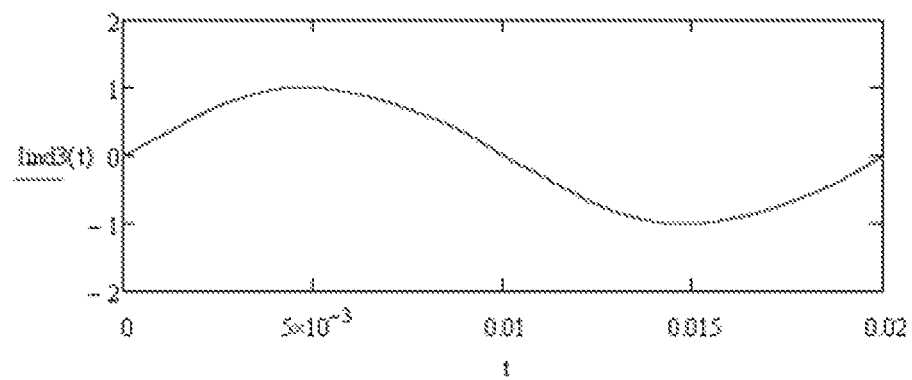
FIG. 6C is a graph depicting a resultant current waveform in accordance with an embodiment of the invention.

FIG. 6A shows the modified positive current reference waveform that is equal to zero for a predetermined period of time prior to the period end of the second half cycle, using the above described method. Similarly, FIG. 6B shows the modified negative current reference waveform that is equal to zero for a predetermined period of time prior to the period end of the first half cycle, using the above described method. FIG. 6C shows the resultant output current using the above described method. As shown in FIG. 6C the resultant current waveform is symmetrical with lower current harmonic components. Using the embodiments disclosed herein, the current THD can be reduced to less than 4% at full load at nominal line voltage.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptable power supply, comprising:
an input to receive an input AC voltage;
an input circuit coupled to the input and including a positive boost circuit and a negative boost circuit, and configured to provide a positive DC voltage at a first output and a negative DC voltage at a second output;
a controller coupled to the input circuit and configured to provide a first current reference signal, the first current reference signal having a periodic waveform including a first half period and a second half period, each half period having a period end, the waveform comprising a substantially rectified sine wave modified such that a value of the rectified sine wave is equal to zero for a predetermined period of time prior to the period end of the second half period;
a positive current loop control circuit coupled to the controller and to the positive boost circuit and configured to receive the first current reference signal and provide an output signal to the positive boost circuit; and
a negative current loop control circuit coupled to the controller and to the negative boost circuit and configured to provide an output signal to the negative boost circuit.

2. The uninterruptable power supply of claim 1, wherein the controller is further configured to provide a second current reference signal to the negative current control circuit, the second current reference signal having a periodic waveform having a first half period and a second half period, each half period having a period end, the waveform comprising a substantially inverted rectified sine wave modified such that a value of the inverted rectified sine wave is equal to zero for a predetermined period of time prior to the period end of the first half period.

3. The uninterruptable power supply of claim 2, wherein each of the positive current loop control circuit and the negative current loop control circuit comprises a clamp circuit each coupled to a current error amplifier.

4. The uninterruptable power supply of claim 1, wherein the predetermine period of time is approximately 0.8 milliseconds.

5. The uninterruptable power supply of claim 2, wherein the predetermined period of time is approximately 0.8 milliseconds.

6. The uninterruptable power supply of claim 2, wherein the positive boost circuit includes a first inductor and the negative boost circuit includes a second inductor and wherein the controller is configured to detect an inductor current from at least one of the first inductor and the second inductor and provide an inductor current value to at least one of the positive current loop control circuit and the negative current loop control circuit.

7. The uninterruptable power supply of claim 6, wherein the positive current loop control circuit includes a current error amplifier configured to receive the first current reference signal and the inductor current from the first inductor and configured to generate a current error value.

8. The uninterruptable power supply of claim 7, wherein the positive boost circuit includes a first transistor, and the positive current loop control circuit includes a comparator configured to receive the current error value from the current error amplifier and wherein the first transistor is configured to switch to an on state based on an output of the comparator.

9. The uninterruptable power supply of claim 6, wherein the negative current loop control circuit includes a current error amplifier configured to receive the second current reference signal and the inductor current from the second inductor and configured to generate a current error value.

10. The uninterruptable power supply of claim 9, wherein the negative boost circuit includes a second transistor, and the negative current loop control circuit includes a comparator configured to receive the current error value from the current error amplifier and wherein the second transistor is configured to switch to an on state based on an output of the comparator.

11. A method of operating an uninterruptable power supply including an input circuit including a positive boost circuit and a negative boost circuit, the method comprising:
receiving an input AC voltage at an input of the input circuit;
generating a first current reference signal, the first current reference signal having a periodic waveform including a first half period and second half period, each half period having a period end, the waveform comprising a substantially rectified sine wave modified such that a value of the rectified sine wave is equal to zero for a predetermined period of time prior to the period end of the second half period;
producing, by a positive current loop control circuit, a first output signal based in part on the first current reference signal and providing the first output signal to the positive boost circuit;
producing, a second output signal, by a negative current loop control circuit, and providing the second output signal to the negative boost circuit; and
generating a positive DC voltage at a first output of the positive boost circuit and a negative DC voltage at a second output of the negative boost circuit.

12. The method of claim 11, further comprising:
generating a second current reference signal having a periodic waveform a first half period and a second half period, each half period having a period end, the waveform comprising a substantially inverted rectified sine wave modified such that a value of the inverted rectified sine wave is equal to zero for a predetermined period of time prior to the period end of the first half period; and
producing, by the negative current loop control circuit, the second output signal based in part on the second current reference signal.

13. The method of claim 12, wherein the predetermined period of time is approximately 0.8 milliseconds.

14. The method of claim 11, wherein the positive boost circuit includes a first inductor and the negative boost circuit including a second inductor, the method further comprising:
detecting an inductor current from at least one of the first inductor and the second inductor; and
providing an inductor current value to at least one of the positive current loop control circuit and the negative current loop control circuit.

15. The method of claim 14, further comprising generating a current error value based on at least one of the first current reference signal and the second current reference signal and the inductor current value, by at least one of a first current amplifier included in the positive current loop and a second current amplifier included in the negative current loop.

16. The method of claim 15, further comprising discharging a minority charge of the first current error amplifier and the second current error amplifier prior to the period end of the second half period associated with the periodic waveform of the first current reference signal and prior to the period end of the first half period of the periodic waveform of the second current reference signal.

17. The method of claim 15, further comprising generating a pulse width modulation control waveform based in part on the current error value, the pulse width modulation control waveform having a switching frequency.

18. The method of claim 17, wherein the predetermined period of time prior to the period end is approximately a sixth of the switching frequency.

19. An uninterruptable power supply, comprising:
an input to receive an input AC voltage;
an input circuit coupled to the input and including a positive boost circuit and a negative boost circuit, and configured to provide a positive DC voltage at a first output and a negative DC voltage at a second output;
a controller coupled to the input circuit and configured to provide a first current reference signal, the first current reference signal having a periodic waveform including a first half period and a second half period, each half period having a period end;
a positive current loop control circuit coupled to the controller and to the positive boost circuit having a first current error amplifier and configured to provide an output signal to the positive boost circuit;
a means for discharging an excess charge associated with the first current error amplifier to allow the first current error amplifier to come out of saturation prior to the period end of the second half period associated with the periodic waveform of the first current reference signal; and
a negative current loop control circuit having a second current error amplifier coupled to the controller and to the negative boost circuit and configured to provide an output signal to the negative boost circuit.

20. The uninterruptable power supply of claim 19, wherein the controller is configured to provide a second current reference signal, the second current reference signal having a periodic waveform including a first half period and a second half period, each half period having a period end, and further comprising means for discharging an excess charge the second current error amplifier to allow the second current error amplifier to come out of saturation prior to the period end of the first half period associated with the periodic waveform of the second current reference signal.

\* \* \* \* \*